Aug. 16, 1927. J. KIM Re. 16,705

SANITARY COVER

Original Filed April 6, 1922

Inventor
Julius Kim

By E. B. Ford

Attorney

Reissued Aug. 16, 1927. Re. 16,705

UNITED STATES PATENT OFFICE.

JULIUS KIM, OF PITTSBURGH, PENNSYLVANIA, ASSIGNOR, BY MESNE ASSIGNMENTS, TO THEODORE LENCHNER, OF PITTSBURGH, PENNSYLVANIA.

SANITARY COVER.

Original No. 1,502,190, dated July 29, 1924, Serial No. 550,115, filed April 8, 1922. Application for reissue filed January 13, 1926. Serial No. 81,111.

This invention relates to sanitary covers and is designed primarily for use in connection with boxes containing fruit, candy pails, pickle kegs, and the like, and the prime feature of the invention is the provision of a cover which may be readily transferred from one receptacle to another, said cover having a transparent section for exhibiting the contents of the box or pail over which it is secured.

A further feature of the invention is the provision of means for attaching the cover to the receptacle with which it is associated.

A further feature of the invention is the provision of a hinge for connecting the cover proper to the retaining member whereby the cover may be readily swung to open position.

A further feature of the invention is the provision of means for causing the parts of the hinge to frictionally engage each other and temporarily hold the cover in elevated position.

A further feature of the invention is the provision of a washer in connection with the hinge for causing the parts of the hinge to more readily adhere to each other and prevent undue wear between the said parts.

And a further feature of the invention is the provision of means for directing a tension against the parts of the hinge for holding them in close proximity to each other.

Other objects and advantages will be hereinafter more fully set forth and pointed out in the accompanying specification.

Figure 1:
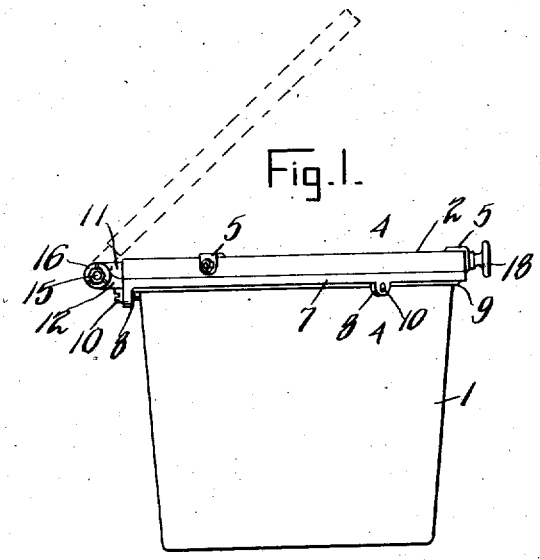
Figure 3:
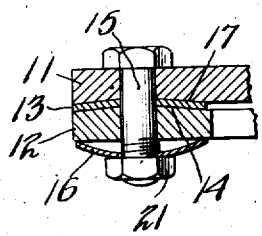
Figure 4:
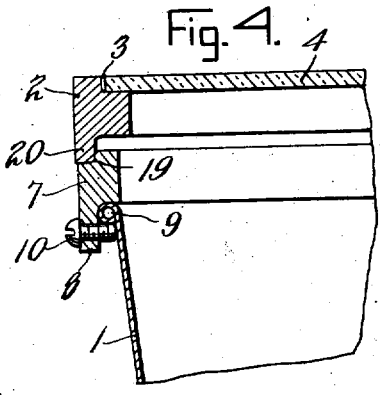
Figure 2:
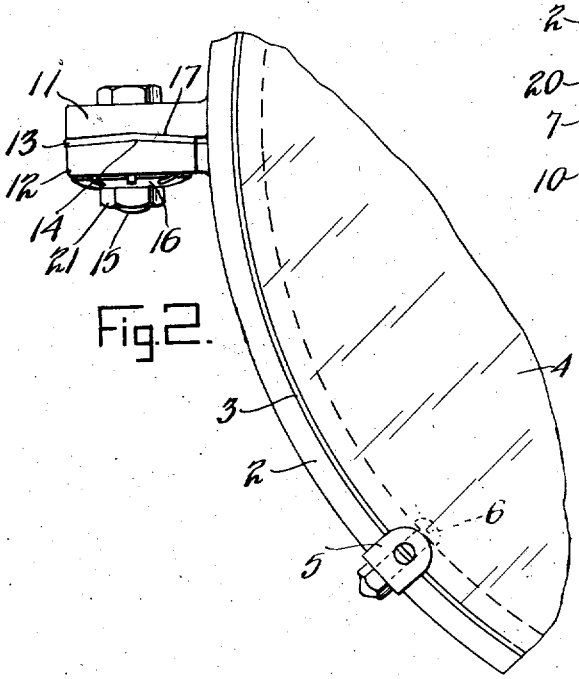

Referring to the accompanying drawings which are made a part hereof and on which similar reference characters indicate similar parts, Figure 1 is a side elevation of a pail showing the cover structure secured thereto, the cover being shown in open position by dotted lines, Figure 2, an enlarged detail top plan view of the cover, Figure 3, a horizontal sectional view through the hinged portion of the cover, and Figure 4 is an enlarged sectional view as seen on line 4—4, Figure 1.

Referring to the drawings, 1 indicates a receptacle which in this instance is shown as a circular pail although it will be understood that the receptacle may be made in any preferred design or shape. In stores and similar places it is customary and necessary to exhibit the articles which are being sold, and in order to fully protect the contents of the receptacles and at the same time exhibit the contents of the receptacle to view, a cover 2 is provided which in this instance is shown in the form of a ring, the upper inner edge of which is provided with a recess 3 in which is seated a transparent section 4, preferably of glass, said transparent section being held seated in the recess by means of clips 5, the vertical section of each clip extending over the outer face of the cover 2, while the horizontal section thereof extends across the top of the cover and over the edge of the transparent section, bolts 6 being extended transversely through the cover 2 and through the vertically extending portions of the clips.

Associated with the cover 2 is a frame 7, the lower edge of which is provided with a flange 8 which passes over the upper edge of the receptacle 1, and when the upper edge of the receptacle is provided with a bead as at 9, screws 10 are threaded through parts of the flange 8 and pass below the bead, thereby locking the frame into engagement with the receptacle.

It will be understood, of course, that with certain classes of receptacles other fastening means than that shown in the drawing may be used.

The cover 2 and frame 7 are each provided with an ear 11 and 12 respectively, the meeting faces of said ears having cam portions 13 and 14 respectively which, when the cover is swung to open position, will be caused to frictionally engage each other and thereby hold the cover in elevated position. The ears 11 and 12 are pivotally connected together by passing a bolt 15 transversely through the ears, said bolt also passing through a spring washer 16 which is so constructed that it will slightly yield as the cover is swung to open position, but the tension of the washer is such that the cam faces of the ears will firmly engage each other.

In order to reduce the wear on the meeting faces of the ears and at the same time increase the frictional action between the cam faces, a plate 17, preferably of fiber, is introduced between the meeting faces of the ears and is held in place by the bolt 15.

In applying the cover to use, after the frame 7 has been properly attached to the receptacle 1, and it is desired to dispense a quantity of the product within the receptacle, the cover 2 is swung upwardly through the medium of a knob 18 and as the cover ascends the cam faces of the ears 11 and 12 will be moved towards each other, thereby setting up a frictional contact between said ears so that the cover will remain in elevated position until such time as it is again manually lowered.

To more thoroughly protect the contents of the receptacle, the upper edge of the frame 7 may be provided with a gutter 19 with which co-operates a bead 20 depending from the cover 2, thereby forming a more perfect seal between the cover and frame. By providing the spring washer in connection with the bolt 15 the frictional engagement between the ears 11 and 12 may be readily regulated by turning the nut 21 inwardly or outwardly on the bolt 15, the tension of the spring washer taking up any wear that may occur between the ears or the friction plate therebetween. This device when properly applied to the receptacle will thoroughly protect the contents thereof and at the same time will not exclude from view the contents of the receptacle, and by providing the frictional contact between the ears the cover will remain in elevated or open position until such time as the proper amount of the contents of the receptacle has been removed.

It will be evident that the display cover herein disclosed may be used on receptacles and display devices of various shapes and is not limited to a receptacle having a round opening at the top. It will be obvious also that various changes may be made in my device without departing from the spirit of the invention and therefore I do not limit myself to what is shown in the drawings and described in the specification but only as indicated in the appended claims.

Having thus fully described my said invention, what I claim as new and desire to secure by Letters Patent, is:

1. In a cover device for receptacles, a frame, a cover fitting over said frame, ears attached to said frame and cover, means for pivotally connecting the ears together. and means for setting up continuing frictional engagement between said ears while the cover is being raised to open position.

2. In a cover construction, a frame, means for removably securing the frame to a receptacle, a cover for said frame, a transparent section in said cover, co-operating ears on said frame and cover, a bolt pivotally connecting the ears together, means for causing said ears to frictionally engage each other while the cover is being raised to a vertical fully open position, and means for yieldingly binding said ears against each other to support the cover in various positions intermediate the closed and vertical positions, substantially as set forth.

3. In a cover construction, a frame, a cover associated therewith, an ear on said frame and cover respectively, means for pivotally connecting the ears together, means for causing said ears to frictionally engage each other as the cover is raised to open position, and a fibrous plate introduced between said ears.

4. In a cover construction, a frame, an ear on said frame, a cover associated with said frame, an ear on said cover, means for pivotally connecting the ears together, and cam portions on the meeting faces of said ears for setting up frictional engagement between the ears, the friction continuing as the cover is raised through an arcuate path of 90° whereby said cover may be supported in various positions within the limits of the said arcuate path, substantially as set forth.

5. In combination, a receptacle for merchandise, a display cover therefor comprising a transparent section, means for connecting said receptacle and cover including cooperating ears, a bolt pivotally connecting the ears, and means for causing said ears to engage each other frictionally while the cover is being raised, said means yieldingly binding said ears against each other to support the cover in any position intermediate the closed and fully open positions, substantially as set forth.

6. In combination a receptacle for merchandise, a display cover therefor comprising a transparent section, means for connecting said receptacle and cover including cooperating ears, means for pivotally connecting said ears and means for setting up continuing frictional engagement between said ears while the cover is being raised to open position, substantially as set forth.

In witness whereof I have hereunto set my hand at Pittsburgh, Pennsylvania, this 6 day of Jan., A. D. one thousand nine hundred and twenty-six

JULIUS KIM.